3,557,249
THERMOSETTING ALLYL RESINS
Bobby F. Dannels and Alvin F. Shepard, Grand Island,
N.Y., assignors to Hooker Chemical Corporation, Niagara Falls, N.Y., a corporation of New York
No Drawing. Filed Dec. 30, 1968, Ser. No. 788,008
Int. Cl. C08g 22/08, 22/16, 41/04
U.S. Cl. 260—858                                           18 Claims

ABSTRACT OF THE DISCLOSURE

There is provided a polymerizable composition comprising (A) at least one polymerizable member of the group of (1) the product of a process which comprises reacting an organic polyisocyanate with an alcohol selected from the group consisting of allyl alcohol, methallyl alcohol and mixtures thereof, and thereafter heating the resulting adduct until there are substantially no free isocyanato groups in the product, (2) the product of a process which comprises reacting an organic polyisocyanate with an alcohol selected from the group consisting of allyl alcohol, methallyl alcohol and mixtures thereof, and thereafter reacting the resulting adduct with with a polyol, and (3) the product of a process which comprises reacting an organic polyisocyanate with an alcohol selected from the group consisting of allyl alcohol, methallyl alcohol and mixtures thereof, and thereafter reacting the resulting adduct with an alkyd resin; and (B) a free radical catalyst. The polymerizable mixtures are useful for many purposes such as in the production of reinforced and laminated plastic articles, and in the preparation of molded articles.

BACKGROUND OF THE INVENTION

Allyl resins have achieved a strong position as molding materials for electrical and electronic parts and in the production of reinforced and laminated plastic articles. They are noted for their excellent shelf stability, controllable flow characteristics, good physical properties, low mold shrinkage, absence of post-mold deformation, insulating properties, high-temperature stability, and resistance to most chemicals and moisture. However, these resins are also characterized by a relatively high cost due to the manner in which they are produced. For example, diallyl phthalate prepolymer, the most widely used allylic compound, is produced by the partial polymerization of diallyl phthalate followed by fractional precipitation. The prepolymer is a solid resin which can be pulverized and handled like a phenolic, i.e., it softens or melts at higher temperatures and becomes thermosetting when mixed with peroxide catalysts.

While the art abounds with allylated elastomers, these elastomers do not have the processing qualities of diallyl phthalate prepolymer. Many are liquid resins which cannot be pulverized and tend to yield soft, sticky materials. Others, exemplified by U.S. Pat. 2,464,519, require the prolonged action of heat and pressure (e.g., 24 hours at 90–95 degrees centigrade) to effect curing. Such a cure speed is insufficient for the majority of commercial applications. The present invention provides low cost, solid, fusible allyl resins which can be cured at commercially practical rates such as 20–100 seconds at 165 degrees centigrade. It has also been discovered that the compositions of this invention can be employed to raise the softening point of alkyd molding compounds.

It is an object of this invention to provide novel thermosetting allyl compositions and a process for producing them. It is another object of this invention to provide novel, solid, fusible allyl compositions which can be employed in the production of reinforced and laminated plastic articles and in the preparation of molded articles. A further object of the invention is to provide compositions similar to or better than diallyl phthalate prepolymer in electrical and processing qualities. A still further object of the invention is to provide low cost compositions similar to diallyl phthalate prepolymer. The invention also has the object of providing compositions which will cure at commercially practical rates. Another object of the invention is to provide compositions which can be employed to raise the softening point of alkyd resins. These and other objects of the invention will become apparent upon a consideration of the following specification.

SUMMARY OF THE INVENTION

This invention relates to novel thermosetting allyl compositions. More particularly, this invention relates to novel thermosetting compositions which comprise (A) at least one polymerizable member of the group of (1) the product of a process which comprises reacting an organic polyisocyanate with an alcohol selected from the group consisting of allyl alcohol, methallyl alcohol and mixtures thereof, and thereafter heating the resulting adduct until there are substantially no free isocyanato groups in the product, (2) the product of a process which comprises reacting an organic polyisocyanate with an alcohol selected from the group consisting of allyl alcohol, methallyl alcohol and mixtures thereof, and thereafter reacting the resulting adduct with a polyol, and (3) the product of a process which comprises reacting an organic polyisocyanate with an alcohol selected from the group consisting of allyl alcohol, methallyl alcohol and mixtures thereof, and thereafter reacting the resulting adduct with an alkyd resin; and (B) a free radical catalyst.

DESCRIPTION OF THE INVENTION

In general, the objects of this invention are accomplished by first preparing an intermediate allyl carbamate by reacting an organic polyisocyanate with allyl alcohol, methallyl alcohol or mixtures thereof. Crotonyl alcohol can also be employed but is less preferred. It is preferred to employ a diisocyanate and more preferably, a diisocyanate in which one isocyanato group is more reactive than the other isocyanato group. Suitable organic diisocyanates include the toluene diisocyanates, particularly 2,4-toluene diisocyanate, 2,6-toluene diisocyanate and mixtures of the two isomers especially mixtures of 80 percent of the 2,4-isomer and 20 percent of 2,6-isomer. Crude mixtures which are commercially available are also useful. Other suitable isocyanates include methylene bis-(4-phenyl isocyanate); hexamethylene diisocyanate; 1,5-naphthalene diisocyanate; 1,3-cyclopentylene diisocyanate; dimer acid diisocyanate; p-phenylene diisocyanate; 2,4,6-tolylene triisocyanate; 4,4',4''-triphenmethane triisocyanate, polyaryl polyisocyanates, such as polymethylene polyphenyl isocyanate, as well as crude commercial mixtures of such organic isocyanates. The preferred organic polyisocyanate is toluene diisocyanate.

The allylic alcohol and the organic polyisocyanate are reacted in a suitable proportion to provide about 1.4 to about 2.2 isocyanato groups per hydroxyl group, preferably about 1.9 to about 2.1 when the intermediate is prepared in an allylic monomer or to be reacted with a polyol or alkyd resin, and preferably about 1.7 to about 1.96 when the intermediate is to be heated until there are substantially no free isocyanato groups left in the product, all as described hereinafter. The temperature can be maintained at about 10 to about 230 degrees centigrade, preferably at about 20 to about 70 degrees centigrade. When toluene diisocyanate is used, the temperature is preferably about 10 to about 50 degrees centigrated and more preferably about 30 to about 50 degrees centigrade. Because the reaction is exothermic, external cooling is provided. It is preferred, although not essential, to employ a catalyst such as N-methyl morpholine, pentaerythritol, lead linoleate, sodium phenate, bis-tert-butyltin oxide, tributylphosphine, and mixtures thereof, in forming the intermediate allyl carbamate.

In one aspect of the invention, the intermediate allyl carbamate is heated at about 140 to about 235 degrees centigrade, preferably at about 160 to about 200 degrees centigrade and preferably in the presence of one or more of the above-described catalysts. After an induction period, an exothermic reaction occurs which is allowed to proceed until there are substantially no free NCO groups left in the product, i.e., there is less than about one weight percent free NCO groups in the product. Without being limited to theory, the product thus produced probably has, for the most part, an isocyanurate type ring structure containing three to eight or more intermediate allyl carbamate units per molecule.

In another aspect of the invention, the intermediate allyl carbamate is reacted with a polyol. The polyols have at least 3 hydroxyl groups, preferably 3 to about 8 hydroxyl groups. Typical polyols include glycerol, trimethylolpropane; trimethylolethane; 1,2,4-butanetriol; 1,2,6-hexanetriol; pentaerythritol; dipentaerythritol; tripentaerythritol; anhydroenneaheptitol; mannitol; sorbitol; methylglucoside; castor oil; novolacs; hydroxyalkylated novolacs; 2,2'-bischloromethyl-1,3-dihydroxpropane; 1,4,5,6,7-hexachlorobicyclo-(2.2.1)-5-heptene-2,3-dimethanol; like compounds apparent to those skilled in the art; and mixtures thereof. The intermediate allyl carbamate is reacted with the polyol in a proportion to provide about 0.9 to about 1.1 free isocyanato groups per hydroxyl group. The reaction mixture is heated to about 140 to about 235 degrees centigrade, preferably at about 140 to 200 degrees centigrade. The reaction time can vary depending on the particular reactants employed, the ratio of reactants and the temperature employed, but generally takes about 1 to about 5 hours. If desired, conventional catalysts for the isocyanato-hydroxyl reaction such as tertiary amines, such as N-methyl morpholine, lead naphthanate and the like can be employed.

Auxiliary hydroxyl containing compounds can be employed in conjunction with the polyol. Among the compounds which can be employed are monohydrox alcohols such as methanol, ethanol, propanol, oleyl alcohol and the like; glycols, such as ethylene glycol, diethylene glycol, propylene glycol, polypropylene glycol, 1,3-propanediol, 1,3-butanediol, neopentyl glycol and the like; and the like compounds. The polyol can also be partially esterified or etherified in order to introduce other desired groupings. For example, additional unsaturation can be provided by employing the monoallyl ether of trimethylol propane and a fire retardant polymerizable product can be obtained by employing the diester of two moles of trimethylol propane and one mole of tetrachlorophthalic acid or chlorendic acid.

In another aspect of the invention, the foregoing polymerizable products may be produced simultaneously by heating a composition comprising the intermediate allyl carbamate and less than an equivalent amount of the polyol based on the hydroxyl and isocyanato groups. In one preferred embodiment, the polyol is employed so as to provide about 10 to about 20 percent of hydroxyl groups based on the free isocyanato content of the intermediate. In still another aspect of the invention, the intermediate allyl carbamate can be heated in the presence of an allylic monomer. Suitable allylic monomers include diallyl phthalate, diallyl isophthalate, diallyl maleate, diallyl chlorendate, diethylene glycol bis(allyl carbonate), triallyl cyanurate, and the like. Generally, the amount of allylic monomer is about 5 to about 25 weight percent based on the total weight of the monomer and intermediate, and preferably about 8 to about 15 weight percent.

It has also been discovered that the intermediate allyl carbamate is useful for modifying alkyl resins. Alkyd molding compounds are well known and are formulated by mixing unsaturated polyesters, which are produced by the reaction of a polyfunctional alcohol such as those described hereinbefore and a polyfunctional acid or anhydride, with fillers, pigments, reinforcing agents, catalysts, lubricants and cross-linking agents. Typical polyfunctional acids or anhydrides are maleic anhydride, fumaric acid, phthalic acid, isophthalic acid, adipic acid, sebacic acid, chlorendic acid, and the like. If the softening point of the unsaturated polyester is too low, it is difficult to pulverize it. When unsautrated polyester is reacted with the intermediate allyl carbamate, the intermediate serves to raise the softening point of the alkyd resin, thus making grinding easier and preventing the ground resin from lumping. Generally, the amount of the intermediate allyl carbamate comprises about 10 to about 20 weight percent based on the weight of the unsaturated polyester. The reaction temperature is generally about 140 to about 210 degrees centigrade, preferably about 160 to about 180 degrees centigrade and is somewhat dependent on the viscosity of the alkyd resin. If desired, conventional hydroxyl-isocyanato catalysts can be used and can be added during the preparation of the intermediate or to the prepared intermediate or to the alkyd resin.

The above-described products and mixtures thereof are converted to insoluble, infusible products by heating the polymerizable products in the presence of one or more free radical catalysts. Suitable catalysts include benzoyl peroxide, 2,4-dichlorobenzoyl peroxide, p-chlorobenzoyl peroxide, acetyl peroxide, methylethyl ketone peroxide, tert-butylperoxybenzoate, 2,5 - dimethyl-2,5-bis(benzoylperoxy)hexane, tert-butylperoxyoctoate, di-tert-butyldiperoxy phthalate, di-tert-butyl peroxide, dicumyl peroxide, and the like. The free radical catalysts are generally employed in amounts ranging from about 0.1 to about 8 weight percent based on the total weight of the composition and preferably from about 2 to about 5 percent.

The compositions of the invention are useful in the preparation of plastic articles in general, reinforced plastic articles containing a reinforcement such as cloth, glass fibers in the form of roving, individual glass fibers, etc., and laminates or other filled resin compositions. Suitable reinforcements for preparing the reinforced articles and laminates include textile fibers, glass fibers or cloth, roving, wood flour, mineral fillers, etc. Castings can also be prepared from the compositions of the present invention. In general, well-known processes of the prior art can be used for preparing the above-mentioned plastic articles, reinforced plastic articles, laminates or other filled resin compositions, and castings, with the exception of substituting the compositions of the invention for that conventionally used. Usually, other changes in the process are not necessary.

The following are examples of suitable reinforcing media and fillers that can be used with the composition of the invention: glass fibers, glass mats, glass cloth, synthetic fibers such as Orlon, mineral fibers such as asbestos, natural fibers such as cotton, silk and wool, metallic fibers such as aluminum and steel, inorganic materials such as calcium carbonate, clay and pigments, and organic materials such as wood flour, cotton and ray flock, sisal fibers and dyes.

The following examples serve to further illustrate the invention but are not intended to limit it. Throughout this specification and claims all parts are by weight and temperatures are in degrees centigrade unless otherwise indicated.

PREPARATION OF INTERMEDIATE ALLYL CARBAMATE

Example 1

A charge of 150 parts of toluene diisocyanate (80%/20% of 2,4,-/2,6-isomer mixture) was placed in a stirred glass reactor blanketed with nitrogen. A charge of 50 parts of allyl alcohol was slowly added and cooling was provided to maintain the temperature below 50 degrees centigrade. After the addition was complete, the mixture was allowed to cool to room temperature. After 16 hours at room temperature, a sample was removed and found to have 18.2 percent NCO groups by titration (theory is 18.1 percent). A portion of this material was stored under nitrogen in glass for 20 days at room temperature and re-analysis showed 18.1 percent of NCO groups, indicating that this product is stable at room temperature.

Example 2

Following the procedure of Example 1, an intermediate allyl carbamate is produced by employing methallyl alcohol in place of the allyl alcohol.

HEATING THE INTERMEDIATE ALLYL CARBAMATE UNTIL SUBSTANTIALLY NO FREE NCO IS LEFT

Example 3

An intermediate allyl carbamate was produced by mixing 1220 parts of allyl alcohol, 3660 parts of toluene diisocyanate (80%/20% of 2,4-/2,6-isomer mixture) and 3.8 parts of N-methyl morpholine and providing cooling to maintain the temperature below 50 degrees centigrade for 8 hours. The resulting intermediate was added to 1220 parts of diallyl phthalate, which was being maintained at 170–190 degrees centigrade, over a 3 hour period and the temperature was maintained for an additional ½ hour. The product was transferred onto flaking rolls and allowed to harden. It was thereafter ground, mixed with 3.0 percent tert-butylperbenzoate and found to cure in 50 seconds at 160 degrees centigrade, thus demonstrating its usefulness as a molding compound binder.

The intermediate was also prepared employing 1220 parts of diallyl phthalate in place of the N-methyl morpholine. The 3.8 parts of N-methyl morpholine was then added to the intermediate at room temperature and the mixture was heated at 170–190 degrees centigrade for 3.5 hours. The resulting polymerizable product was transferred onto flaking rolls and allowed to harden. Thereafter it was ground, mixed with 3 percent tert-butyl-perbenzoate and found to cure in 50 seconds at 160 degrees centigrade.

Example 4

Following the procedure of Example 1, 2090 parts of toluene diisocyanate (80%/20% of 2,4-/2,6-isomer mixture) were reacted with 819 parts of allyl alcohol. Three parts of N-methyl morpholine were added to the product at room temperature and then about 400 parts of the mixture were transferred to another reactor. Three parts of pentaerythritol were added to the second reactor which was heated to 140 degrees centigrade. A highly exothermic reaction resulted with the temperature rising to 200 degrees centigrade. After the mixture was cooled to 180 degrees centigrade, the remainder of the product from the first reactor was added over the course of 2 hours and the temperature was maintained at 180 degrees centigrade for additional 1½ hours. The resulting product was poured into a pan and allowed to harden. The product was a readily grindable solid with a melting point of 86–100 degrees centigrade, a molecular weight of 590 and contained less than 0.3 percent free isocyanato groups. The product was ground, mixed with 3 percent tert-butylperbenzoate and found to cure in less than 40 seconds at 160 degrees centigrade, thus demonstrating its usefulness as a molding compound binder.

Example 5

A charge of 76 parts of polyarylpolyisocyanate was slowly added to 70 parts of allyl alcohol at 60 degrees centigrade which temperature was maintained for 24 hours after the addition was complete. Thereafter, the unreacted allyl alcohol was distilled off with a maximum pot temperature of 120 degrees centigrade and a pressure of 1 millimeter of mercury. The resulting product was a hard, brittle solid which cured at 170 degrees centigrade when catalyzed with dicumyl peroxide.

REACTION WITH POLYOL

Example 6

A charge of 223 parts of trimethylol propane was placed in a stirred glass reactor under nitrogen and heated to 100 degrees centigrade under a vacuum of 5 millimeters of mercury to remove any moisture present. After about 2 hours, the vacuum was released and 1160 parts of the product of Example 1 were slowly added. The reaction temperature was increased as the addition progressed in order to maintain a workable viscosity. After 3 hours, the temperature had risen to 140 degrees centigrade and less than 0.3 percent free isocyanato groups could be detected. The resin was then poured into a pan to harden. The resin was ground, mixed with 3 percent tert-butyl-perbenzoate and cured at 160 degrees centigrade to a hard, insoluble, infusible product demonstrating its usefulness as a molding compound binder.

Example 7

A charge of 227 parts of trimethylolpropane and 151 parts of pentaerythritol were placed into a stirred glass reactor which was heated at 100 degrees centigrade and 2 millimeters pressure for 2½ hours to remove any moisture present. Thereafter, the vacuum was removed and 2 parts of N-methyl morpholine were added as a catalyst. A charge of 2322 parts of the product of Example 1 was slowly added over a 3 hours period. As the viscosity increased, the temperature was slowly raised to 160 degrees centigrade and maintained at this temperature for 2 hours after the addition was complete. The product, which contained less than 0.1 percent free isocyanato groups, was poured into a pan and allowed to harden. It was a brittle, grindable, solid resin having a molecular weight of 875 and readily cured at 160 degrees centigrade when admixed with 3 percent of dicumyl peroxide, thus demonstrating its usefulness as a molding compound binder.

Example 8

Forty parts of trimethylolpropane monoallyl ether was dried by heating at 100 degrees centigrade and 10 millimeters of pressure for 2 hours. Thereafter, 116 parts of the product of Example 1 were added over a 1 hour period during which time the temperature was 90 degrees centigrade. The temperature was then slowly increased to 160 degrees centigrade over a 16 hour period. When the free isocyanato content was determined to be less than 0.5 percent, the product was poured into a pan and allowed to harden. The product was mixed with 3 percent tert-butylperbenzoate and found to cure in 24 seconds at 160 degrees centigrade. One part of the uncured product was dissolved in 1 part of styrene and 1 percent based on the total weight of benzoyl peroxide was added. After heating at 100 degrees centigrade for 1½ hours the mixture cured to a hard, strong product.

FIRE RETARDANT RESIN

Example 9

Tetrachlorophthalic anhydride was reacted with trimethylolpropane in a 1:2 mole ratio until the acid number was less than 1. Two hundred seventy-seven parts of this product were heated to 120 degrees centigrade and 464 parts of the product of Example 1 were added over a period of 70 minutes. The temperature was slowly increased to 160 degrees centigrade and after 2 hours, the product was poured into a pan to harden. When cool, the product was a grindable, solid resin. The grindable, solid resin was compounded into a mineral filled molding compound containing 32 percent resin, 2.8 percent antimony trioxide, 32 percent mica, 30 percent asbestos, 0.5 percent zinc stearate, 0.5 percent lubricant, and 2.2 percent of a 60/40 weight percent premixture of tert-butylperbenzoate and mica. This was molded into 1/8 x 1/2 x 5 inch test bars. The bars were tested by the method of Federal Test Specification No. 408 and found to have an average burning time of 5 seconds. For comparison, similar test specimens were made with the product of Example 7 and found to have an average burning time of 50 seconds.

REACTION WITH ALKYD RESIN FOR MOLDING COMPOUNDS

Example 10

A charge of 3000 grams of an isophthalic acid-propylene glycolfumaric acid alkyd resin was melted under a nitrogen atmosphere. Three hundred ten grams of the product of Example 1 were added over a 105 minute period at 150 degrees centigrade and with agitation. The viscosity of the resin increased slightly during the addition and the temperature was raised to 170 degrees centigrade to facilitate stirring and maintained at 170 degrees centigrade for 1 hour after the addition was complete. The resin was then poured into a pan and allowed to harden. The unmodified alkyd resin had a melting point of 57 (slush)–67 (clear) degrees centigrade and the modified resin had a melting point of 64 (slush)–76 (clear) degrees centigrade.

MOLDING COMPOUND

Example 11

A charge of 1742 parts of toluene diisocyanate (80%/20% of 2,4-/2,6-isomer mixture) wast placed into a stirred glass reactor blanketed with nitrogen and 640 parts of allyl alcohol were slowly added. Cooling was provided to maintain the temperature below 40 degrees centigrade. After 16 hours, the free isocyanato content was determined to be 15.7 percent (theory: 15.8 percent). Two parts of pentaerythritol and 2 parts of N-methyl morpholine were added and the temperature slowly raised to 140 degrees centigrade. After an indiuction time of 45 minutes, a highly exothermic reaction resulted with the temperature increasing to 220 degrees centigrade. Cooling was applied to bring the temperature to 180 degrees centigrade and after 1 hour, the product was poured into a pan to harden. The solid product had a molecular weight of 600, a free isocyanato content of less than 0.3 percent, a melting point of 75–97 degrees centigrade, and was easily grindable into a fine powder.

The resin was pulverized and converted into a molding compound of the following formula:

| | Parts |
|---|---|
| Resin | 30.6 |
| 1/8 inch glass fiber | 42.0 |
| Silicate fillers | 21.4 |
| Lubricant | 1.1 |
| Diallyl phthalate monomer | 1.5 |
| Vinyl silane | 1.9 |
| Dicumyl peroxide | 1.5 |

Test specimens cured readily, requiring only about 50 seconds at 165 degrees centigrade for cure of the plasticity cup. Rapid cures were similarly obtained when the dicumyl peroxide was replaced with tert-butyl hyperoxide or benzoyl peroxide.

A molding compound was also prepared by the foregoing formula in which diallyl phthalate prepolymer replaced the resin of this invention. The table below compares the molded properties of the cured test specimens.

TABLE I

| Properties | Resin | Diallyl phthalate prepolymer |
|---|---|---|
| Heat distortion temperature, °F | 430 | 330 |
| Flexural strength, pounds/square inch | 13,000 | 17,000 |
| Impact strength, foot pounds/inch | 0.53 | 0.50 |
| Dissipation factor, 1 mc | 0.008 | 0.014 |
| Humid insullation resistance in ohms. 720 hours | $8 \times 10^8$ | $7 \times 10^8$ |
| Arch resistance, seconds | 139 | 130 |

The foregoing results demonstrate that the resin of this invention closely resembles or surpasses the high-cost conventional diallyl phthalate prepolymer resin in its molded properties.

Various changes and modifications can be made in the process and products of this invention without departing from the spirit and scope of the invention. The various embodiments of the invention disclosed herein serve to further illustrate the invention, but are not intended to limit it.

We claim:
1. A thermosetting composition comprising:
 (A) at least one polymerizable member selected from the group consisting of
  (1) the product of a process which comprises reacting an organic polyisocyanate with an alcohol selected from the group consisting of allyl alcohol, methallyl alcohol and mixtures thereof, and thereafter reacting the resulting adduct with a polyol, and
  (2) the product of a process which comprises reacting an organic polyisocyanate with an alcohol selected from the group consisting of allyl alcohol, methallyl alcohol and mixtures thereof, and thereafter reacting the resulting adduct with an alkyd resin; and
 (B) a free radical catalyst;
wherein said organic polyisocyanate and said alcohol are reacted in a proportion to provide about 1.4 to about 2.2 isocyanato groups per hydroxyl group.

2. The thermosetting composition of claim 1 wherein the alcohol is allyl alcohol.

3. The thermosetting composition of claim 2 wherein the organic polyisocyanate is toluene diisocyanate.

4. A molding compound comprising the thermosetting composition of claim 1, and reinforcing media and fillers therefor.

5. A molded article comprising the polymerized composition of claim 4.

6. A reinforced plastic article comprising the polymerized composition of claim 1 and a reinforcing medium therefor.

7. A laminated article comprising a plurality of layers of reinforcing medium and as a binder therefor the polymerized composition of claim 1.

8. A product of a process which comprises reacting an organic polyisocyanate with an alcohol selected from the group consisting of allyl alcohol, methallyl alcohol and mixtures thereof, and thereafter reacting the resulting adduct with a polyol, wherein said organic polyisocyanate and said alcohol are reacted in a proportion to provide about 1.4 to about 2.2 isocyanato groups per hydroxyl group.

9. The product of claim 8 wherein the alcohol is allyl alcohol and the organic polyisocyanate is toluene diisocyanate.

10. A product of a process which comprises reacting an organic polyisocyanate with an alcohol selected from the group consisting of allyl alcohol, methallyl alcohol and mixtures thereof, and thereafter reacting the resulting adduct with an alkyd resin, wherein said organic polyisocyanate is reacted with said alcohol in a proportion to provide about 1.4 to about 2.2 isocyanate groups per hydroxyl group.

11. The product of claim 10 wherein the alcohol is allyl alcohol and the organic polyisocyanate is toluene diisocyanate.

12. A process which comprises mixing a free radical catalyst with at least one polymerizable member selected from the group consisting of:
  (1) the product of a process which comprises reacting an organic polyisocyanate with an alcohol selected from the group consisting of allyl alcohol, methallyl alcohol and mixtures thereof, and thereafter reacting the resulting adduct with a polyol, and
  (2) the product of a process which comprises reacting an organic polyisocyanate with an alcohol selected from the group consisting of allyl alcohol, methallyl alcohol and mixtures thereof, and thereafter reacting the resulting adduct with an alkyd resin;
and polymerizing the product by heating at an elevated temperature wherein said organic polyisocyanate is reacted with said alcohol in a proportion to provide about 1.4 to about 2.2 isocyanato groups per hydroxyl group.

13. The process of claim 12 wherein the alcohol is allyl alcohol.

14. The process of claim 13 wherein the organic polyisocyanate is toluene diisocyanate.

15. A process which comprises reacting an organic polyisocyanate with an alcohol selected from the group consisting of allyl alcohol, methallyl alcohol and mixtures thereof, and thereafter reacting the resulting adduct with a polyol, wherein said organic polyisocyanate is reacted with said alcohol in a proportion to provide about 1.4 to about 2.2 isocyanato groups per hydroxyl group.

16. The process of claim 15 wherein the alcohol is allyl alcohol and the organic polyisocyanate is toluene diisocyanate.

17. A process which comprises reacting an organic polyisocyanate with an alcohol selected from the group consisting of allyl alcohol, methallyl alcohol and mixtures thereof, and thereafter reacting the resulting adduct with an alkyd resin, wherein said organic polyisocyanate is reacted with said alcohol in a proportion to provide about 1.4 to about 2.2 isocyanato groups per hydroxyl group.

18. The process of claim 17 wherein the alcohol is allyl alcohol, and the organic polyisocyanate is toluene diisocyanate.

References Cited
UNITED STATES PATENTS

| | | | |
|---|---|---|---|
| 2,464,519 | 3/1949 | Lichty et al. | |
| 2,952,665 | 9/1960 | Bunge et al. | |
| 3,100,759 | 8/1963 | Boussu et al. | 260—77.5 |
| 3,297,745 | 1/1967 | Fekete et al. | 260—471 |
| 3,402,148 | 9/1968 | Sutker et al. | 260—75 |
| 3,448,171 | 6/1969 | Damusis | 260—859 |

DONALD E. CZAJA, Primary Examiner

H. S. COCKERAM, Assistant Examiner

U.S. Cl. X.R.

161—190; 260—9, 18, 23, 37, 41, 77.5